United States Patent
Chittenden

(10) Patent No.: US 6,895,983 B2
(45) Date of Patent: May 24, 2005

(54) METHOD AND APPARATUS FOR DIVIDING THE FLOW OF A GAS STREAM

(75) Inventor: John Chittenden, Seattle, WA (US)

(73) Assignee: The Chemithon Corporation, Seattle, WA (US)

(*) Notice: Subject to any disclaimer, the term of this patent is extended or adjusted under 35 U.S.C. 154(b) by 110 days.

(21) Appl. No.: 10/255,796

(22) Filed: Sep. 26, 2002

(65) Prior Publication Data

US 2004/0060595 A1 Apr. 1, 2004

(51) Int. Cl.[7] .............................................. G05D 11/02
(52) U.S. Cl. .................... 137/1; 137/7; 137/9; 137/597; 137/806; 137/807
(58) Field of Search ............................. 137/1, 7, 9, 597, 137/803, 806, 807, 240, 111, 114, 110

(56) References Cited

U.S. PATENT DOCUMENTS

| | | | |
|---|---|---|---|
| 3,417,779 A | * 12/1968 | Golay ........................ 137/896 |
| 3,670,754 A | * 6/1972 | Freeman ..................... 137/805 |
| 3,712,325 A | * 1/1973 | Harnoncourt ................ 137/597 |
| 4,058,372 A | 11/1977 | DeLaMater ..................... 55/5 |
| 4,281,821 A | 8/1981 | Kawazoe et al. ............. 266/44 |
| 4,333,746 A | 6/1982 | Southam ..................... 55/106 |
| 4,466,815 A | 8/1984 | Southam ...................... 55/122 |
| 4,533,364 A | 8/1985 | Altman et al. .................. 55/5 |
| 4,705,669 A | * 11/1987 | Tsuji et al. ............. 137/599.03 |
| 4,770,674 A | 9/1988 | Tellini et al. .................... 55/5 |
| 4,844,723 A | 7/1989 | Tellini et al. ................. 55/106 |
| 5,024,171 A | 6/1991 | Krigmont et al. ........... 110/345 |
| 5,074,226 A | 12/1991 | Lynch ........................ 110/345 |
| 5,196,038 A | 3/1993 | Wright ............................ 55/5 |
| 5,288,303 A | 2/1994 | Woracek et al. ................. 95/2 |
| 5,288,309 A | 2/1994 | Wright ......................... 96/22 |
| 5,320,052 A | 6/1994 | Spokoyny et al. .......... 110/345 |
| 5,350,441 A | 9/1994 | Wright ......................... 95/58 |
| 5,524,557 A | 6/1996 | Spokoyny ................... 110/203 |
| 5,525,317 A | 6/1996 | Bhat et al. .................. 423/235 |
| 5,538,539 A | 7/1996 | Spokoyny et al. ............. 96/52 |
| 5,665,142 A | 9/1997 | Wright ......................... 95/58 |
| 5,720,315 A | * 2/1998 | Palmer ....................... 137/240 |

FOREIGN PATENT DOCUMENTS

| | | |
|---|---|---|
| GB | 1093617 | 12/1967 |
| GB | 2257643 A | 1/1993 |

* cited by examiner

Primary Examiner—Stephen M. Hepperle
(74) Attorney, Agent, or Firm—Marshall, Gerstein & Borun LLP

(57) ABSTRACT

An apparatus for dividing the flow of a gas stream and a method for controlling the flow division of a gas stream are disclosed, the apparatus including an inlet conduit for receiving the gas stream, outlet conduits in fluid communication with the inlet conduit for delivering the gas stream, a balancing gas feed conduit in fluid communication with an outlet conduit, a balancing gas feeder in fluid communication with the balancing gas feed conduit, and a balancing gas controller; and the method including the steps of dividing the process gas stream into process gas stream fractions and injecting a balancing gas stream into a process gas stream fraction in an amount sufficient to displace a portion of gas flow from the process gas stream fraction into one or more remaining process gas stream fractions.

16 Claims, 2 Drawing Sheets

METHOD AND APPARATUS FOR DIVIDING THE FLOW OF A GAS STREAM

BACKGROUND

1. Field of the Invention

The invention generally relates to a method and apparatus for dividing the flow of a gas stream. More particularly, the invention relates to a method and apparatus for controlling the flow division of a corrosive conditioning gas stream.

2. Brief Description of Related Technology

In so-called flue gas conditioning applications, a conditioning gas, frequently diluted in hot air, is injected into a flue gas duct by means of a pipeline and a distribution manifold that supplies equal portions of the gas mixture to an array of parallel injection probes. Each probe itself is an extension of the distribution manifold, and is typically a capped pipe with a series of ports (e.g., holes) formed along the sides of the pipe, frequently directed at a tangent to the flue gas flow direction in the duct, to inject substantially equal portions of the gas through each hole. The injection manifold and array of probes are designed to use the pressure drop through the apparatus to distribute gas evenly through all of the parallel paths into the duct. The manifold is typically designed to make pipelines symmetrical when more than one flue gas duct is treated using a single source of conditioning agent.

Typical conditioning agents include sulfur trioxide and ammonia, which are used in effluent gas treatment applications, for example in fossil fuel-fired boilers such as may be found in electric power generating plants. These agents can be used in methods of treating flue gas to improve the efficiency of fly ash collection by electrostatic precipitators or bag houses, for example. Another application is the use of ammonia in systems designed to remove nitrogen oxides from flue gas, including selective catalytic reduction (SCR) and selective non-catalytic reduction (SNCR) methods. Frequently, such as in these methods, it is important that the rate at which the conditioning agent is added to the flue gas can be controlled to respond to changes in the flue gas properties or quantity of flue gas.

In an electricity generating plant, for example, it often occurs that the plant is equipped with two or more nearly identical boilers arranged in parallel with nearly identical effluent gas treatment systems similarly arranged. In other plants, the boilers can have a common effluent gas stream divided and fed into two or more smaller effluent treatment systems of equal or different capacity arranged in parallel and in close proximity to one another. Thus, it is commonly found that there is the opportunity to supply a conditioning agent, such as sulfur trioxide, from a single source to more than one injection location. In such cases, it is necessary to divide (equally or unequally) the conditioning agent gas stream in a controlled manner so that a desired proportion of the conditioning agent is supplied to each injection location. In addition, it is necessary to actively control the apportionment (i.e., division and assignment) of the conditioning agent stream to respond to changes in demand for the conditioning agent, for example by changes in flue gas properties, by differing boiler operating rates, differing effluent gas flows though treatment systems, or during startup or shutdown of one or more boilers.

Previous attempts have been made to control the division of sulfur trioxide-containing gas streams using flow measuring sensors and flow control valves. However, such flow control valves and flow sensors, when exposed to hot sulfur trioxide-containing gas streams, have serious reliability problems. Many of the flow sensing technologies cannot be used at elevated operating temperatures. In an application for flue gas conditioning using gaseous sulfur trioxide, the sulfur trioxide is typically diluted in hot air and maintained at a temperature above the dew point of sulfuric acid (e.g., about 500° F.) to avoid condensation of sulfuric acid or oleum (a sulfur trioxide/sulfuric acid mixture). Likewise, the pipelines and flow control valves must be insulated and may be heated to avoid such condensation. Such control valves can fail by seizing, for example caused by corrosion and fouling of the control valve stem. Similarly, flow sensors can be damaged by sulfuric acid and/or oleum condensation and fouling. Condensation of sulfuric acid is one mechanism that is believed to contribute to this type of failure, though other factors, such as the extreme temperature variations that the valves and sensors experience, can also contribute to failure. Similarly, condensation of solid ammonium salts from an ammoniacontaining conditioning gas stream can foul valves and sensors used to control the flow of such a stream.

SUMMARY

One aspect of the disclosure provides an apparatus for dividing the flow of a gas stream, including: outlet conduits for delivering a gas stream; a balancing gas feed conduit in fluid communication with an outlet conduit; and a balancing gas feeder in fluid communication with the balancing gas feed conduit.

Another aspect of the disclosure provides a method for controlling the flow division of a gas stream, including the steps of: dividing a first gas stream into first gas stream fractions; and injecting a second gas stream into a first gas stream fraction to displace a portion of gas flow from the first gas stream fraction.

Further aspects and advantages may become apparent to those skilled in the art from a review of the following detailed description, taken in conjunction with the appended claims. While the invention is susceptible of embodiments in various forms, described hereinafter are specific embodiments with the understanding that the disclosure is illustrative, and is not intended to limit the invention to the specific embodiments described herein.

DETAILED DESCRIPTION

Figure 1:
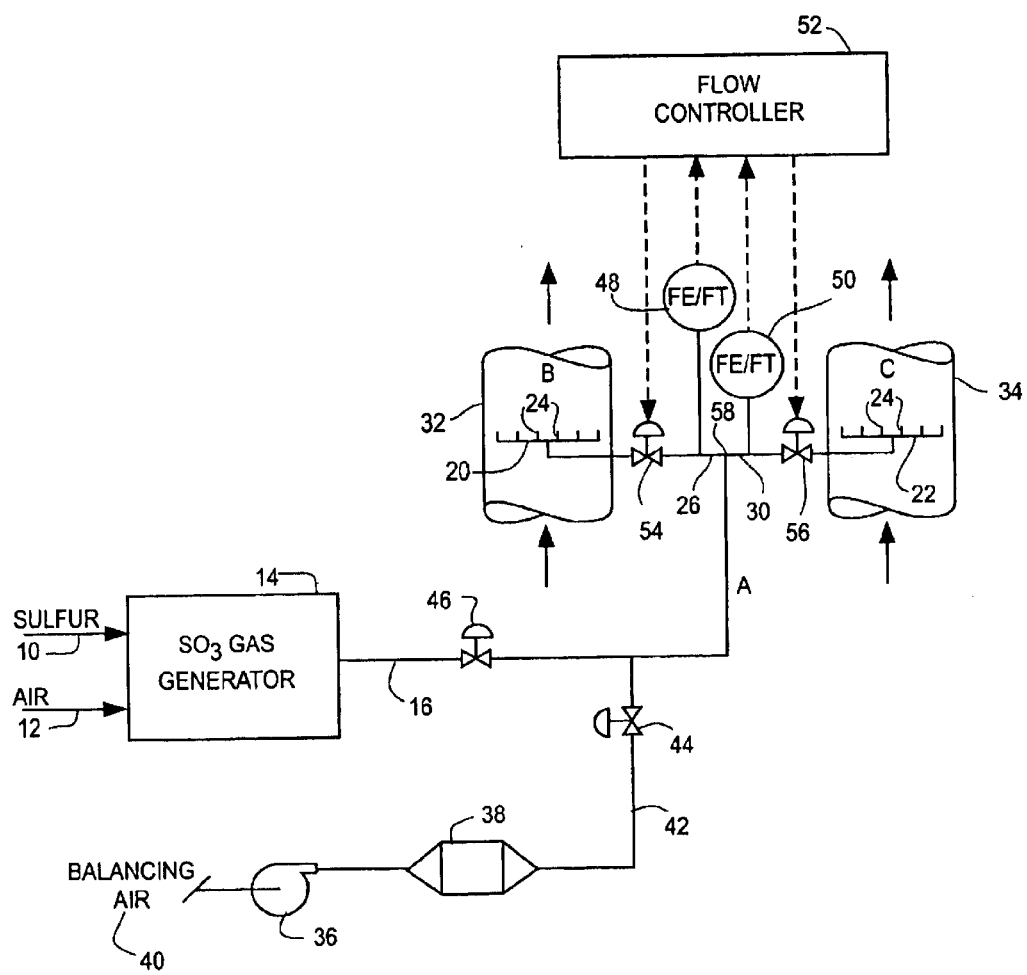
FIG. 1 shows apparatus for injecting streams of sulfur trioxide in air from a common source into two flue gas ducts according to the prior art.

The invention generally relates to a method and apparatus for dividing the flow of a gas stream into gas stream fractions, and is particularly advantageous for dividing the flow of a corrosive gas stream through a plurality of conduits, without the use of flow control apparatus (e.g., sensors and modulators such as valves) associated with conduits that carry the corrosive gas. The primary gas stream to be divided is also referred to herein as the process gas or the process gas stream.

One aspect of the disclosure is a method for controlling the flow division of a process gas stream, including the steps of dividing the process gas stream into process gas stream fractions, and injecting a balancing gas stream into a process gas stream fraction in an amount sufficient to displace a portion of process gas flow from the process gas stream fraction into one or more remaining process gas stream fractions. Injection can be achieved by maintaining fluid communication between the balancing gas stream and the process gas stream, and providing the balancing gas stream at higher pressure than the process gas stream. By practice of the method disclosed herein, wherein balancing gas can be combined with a process gas stream, the combined stream will also be referred to as a process gas stream, unless otherwise distinguished.

The process gas stream can include any gaseous component and may optionally include fluidized particulate matter. For flue gas conditioning applications, sulfur trioxide and ammonia are preferred components of a conditioning process gas. As described below, the apparatus and methods disclosed herein are particularly advantageous when the gas stream includes a component that can reduce the effectiveness of flow control equipment, but the apparatus and methods are applicable to the use of any gas. One such harmful component is a gas that is corrosive to flow control valves, such as sulfur trioxide. Other such harmful components can include gases or particulate matter that have the potential to seize, block, or otherwise foul flow control equipment, such as valves and flow sensing instruments. The apparatus and methods disclosed herein may also have particular utility with the use of an explosive gas.

The balancing gas preferably is substantially inert, e.g., one that does not react in sufficient quantity to detract from the effectiveness of the primary gas stream in the application desired. For example, in an apparatus used to divide the flow of a gas stream that includes sulfur trioxide and air for conditioning flue gas for particulate removal, a suitable balancing gas is air. In many applications, air will be preferred on the basis of cost and non-reactivity. Other balancing gas components can include nitrogen, and the noble gases (helium, neon, argon, krypton, and xenon) When a common source of balancing gas is itself divided into a plurality of balancing gas feed conduits, preferably the balancing gas will be substantially non-corrosive to the flow division components (e.g., valves and flow sensors). The balancing gas stream can also include fluidized particulate matter, but preferably is substantially free of fluidized particulate matter (e.g., intentionally added and/or subject to formation in the gas stream), such that it will not interfere with the operation of a flow control device. In suitable applications, the balancing gas can include a component that reacts with a component in the process gas.

The methods can also include a step of dividing the balancing gas stream into balancing gas stream fractions, and selectively injecting a balancing gas stream fraction into a process gas stream fraction in an amount sufficient to displace a portion of process gas flow from the process gas stream fraction into one or more remaining process gas stream fractions.

Other methods can also include a step of dividing a balancing gas stream into balancing gas stream fractions, measuring the flow of each balancing gas stream fraction, heating the balancing gas stream and/or fractions, modulating the flow of each balancing gas stream fraction with a balancing gas controller and one or more control valves in one or more balancing gas stream fractions, and selectively injecting a balancing gas stream fraction into a process gas stream fraction in an amount sufficient to displace a portion of process gas flow from the process gas stream fraction into one or more remaining process gas stream fractions, preferably in the order recited.

The methods can further include steps of heating one or more of the streams, such as a balancing gas stream, a process gas stream, and a process gas stream fraction. As it is known in the art, the temperature and volume that a quantity of gas occupies are interrelated (expressed, for example, by the ideal gas law). Accordingly, because the volume flow rate of the mixture of balancing gas and process gas will determine the division of the mixed gas stream, temperature sensors associated with one or more process gas streams and balancing gas streams can aid in more accurately controlling the volume of the resulting mixed gas stream and, thus, the division of the stream. Preferably, the temperature of both one or more process gas streams and one or more balancing gas streams is measured, and one or more heaters in thermal communication with such streams are controlled to control the temperatures of the associated streams.

Preferably, a method disclosed herein can be practiced with apparatus including one or more of the devices described herein.

Another aspect of the disclosure is an apparatus that includes an inlet conduit for receiving a gas stream, outlet conduits in fluid communication with the inlet conduit for delivering the gas stream, a balancing gas conduit in fluid communication with an outlet conduit, a balancing gas feeder in fluid communication with the balancing gas conduit, and a controller for controlling the rate of flow of balancing gas through the balancing gas conduit.

The conduits for conveying (including receiving and delivering) the process gas stream are not limited, and can be selected from any material and configuration compatible with the process gas and designed to function at the operating pressures desired. Suitable materials include those commonly used to convey gases, including metal (e.g., steel and iron) and plastic (e.g., polyethylene) cylindrical pipes. In an apparatus used to deliver conditioning gas to a flue gas stream (e.g., in a flue gas duct), an outlet conduit preferably will be in fluid communication with a plurality of conditioning gas injection probes.

The balancing gas feeder provides a motive force to convey the balancing gas through the balancing gas conduit and into one or more corresponding outlet conduits for delivering the process gas. Suitable feeders include compressors, fans, and blowers, although a source (e.g., a cylinder) of compressed balancing gas itself can function as a feeder.

In one embodiment, a balancing gas controller controls the rate of flow of balancing gas through the balancing gas conduit. Suitable controllers include restriction devices, such as a modulating valve in fluid communication with the balancing gas conduit, and variable-speed devices used with, compressors, fans, and blowers, for example. Optionally, a pressure, such as the pressure in a balancing gas conduit, can be controlled. Preferably, a balancing gas controller is in communication with a process control system that includes one or more sensors, designed to operate the balancing gas controller in response to changes in demand for a gas stream fraction, as described below in connection with the methods described herein.

The apparatus can include a plurality of balancing gas conduits, for example in the case when the process gas stream is divided into a plurality of process gas stream fractions. For example, each balancing gas conduit can be in fluid communication with an outlet conduit and a common balancing gas feeder, for example via a common balancing gas feed conduit. In a preferred embodiment, a common balancing gas feeder is used to supply a common source of balancing gas, and the balancing gas stream can be divided into a plurality of fractions, preferably with the use of a plurality of controllers. Optionally, a plurality of balancing gas feeders can be used to supply balancing gas from a single source or multiple sources. Each conduit carrying a balancing gas fraction can be associated with a controller, or only some such conduits can be associated with a controller (e.g., all but one).

For example, a preferred apparatus for dividing the flow of a sulfur trioxide-containing conditioning gas stream to a plurality of flue gas ducts includes: an inlet conduit for receiving a conditioning gas stream; outlet conduits in fluid communication with the inlet conduit for delivering the conditioning gas stream to injection probes; an air feed conduit; balancing air conduits, each balancing air conduit in fluid communication with the air feed conduit and an outlet conduit; a balancing air feeder in fluid communication with the air feed conduit; flow sensors; temperature sensors; valves for controlling the rate of flow of air through the balancing air conduits, each valve in fluid communication with a balancing air conduit; flow sensors in fluid communication with the balancing air conduits; and heaters in thermal communication with the air feed conduits downstream of the flow sensors.

Another aspect of the disclosure is an apparatus adapted for use with an existing system that divides the flow of a conditioning gas stream for use in more than one location. Such an apparatus for controlling the flow division of a conditioning gas stream through conditioning gas outlet conduits can include: balancing gas conduits adapted for fluid communication with conditioning gas outlet conduits; flow sensors and valves for controlling the rate of flow of balancing gas streams, each valve in fluid communication with a balancing gas conduit; temperature sensors; a blower or fan for feeding balancing gas; a balancing gas feed conduit in fluid communication with the blower for conveying balancing gas to the balancing gas conduits; a heater in thermal communication with the balancing gas feed conduit and/or one or more balancing gas conduits; and a process control system adapted for receiving demand signals proportional to feed rate demands of conditioning gas from each of the conditioning gas outlet conduits and for providing control signals to deliver the desired flow of balancing gas to each conduit. As described above, a system might divide the flow of a conditioning gas stream in constant proportion to a plurality of uses, wherein each use has a fixed demand (e.g., two boilers operating at the same or different capacities). By use of the apparatus just described, the system can be adapted to control the flow division of the conditioning gas stream, such that the boilers can be operated at the different capacities, with different boiler effluent gas compositions and flows, while still employing much of the same conditioning gas generation and delivery apparatus. Similarly, a method as disclosed herein can be used to apportion flows of conditioning agent to effluent gas treatment equipment of different size and capacity used to treat the gas from one or more boiler effluent gas streams. One embodiment includes the use of ambient air or dried air as all or part of the balancing gas.

Any of the apparatus disclosed herein can also include other elements, such as process control equipment, including sensors and controllers, and other elements to affect the streams delivered, such as heaters, coolers, condensers, and the like. The apparatus can be used alone, added as a discrete operation to an existing system, and integrated with other operations in a system.

EXAMPLES

The following examples are provided to illustrate the invention but are not intended to limit the scope of the invention.

Example 1

FIG. 1 illustrates a process and apparatus according to the prior art, for supplying sulfur trioxide to modify the resistivity of fly ash in flue gas and enable improved collection efficiency in downstream electrostatic precipitators (not shown). Respective sources of sulfur 10 and air 12 are fed to a sulfur trioxide gas generator 14 to generate a single stream of sulfur trioxide gas in air 16. The stream 16 is piped to injection manifolds 20 and 22 and probes 24 via two branches 26 and 30, respectively of the stream 16. The injection manifolds 20 arid 22 are disposed within flue gas ducts 32 and 34, respectively. Flow elements/transmitters 48 and 50 in branches 26 and 30, respectively, send signals to flow controller 52, which, in turn, controls valves 54 and 56 in branches 26 and 30, respectively.

An auxiliary blower 36 and a heater 38 are optionally provided to feed and heat a source of air 40 via a pipe 42 through the pipeline 16 and the injection manifolds 20 and 22 when the sulfur trioxide generator system 14 is off-line. Valves 44 and 46 can be provided to direct the flow of the heated air 40.

Without dynamic flow splitting controls (e.g., if both valves 54 and 56 were equally open), the amount of the conditioning agent stream 16 that is fed to each injection location (e.g., manifolds 20 and 22 depends on the design of the conduits, the injection manifold, and the probes present in each branch). Factors influencing the distribution of flow are primarily those that contribute to pressure drop, such as the cross-section of the conduits or other restrictions to flow, and the length of the flow path in each branch.

In this example, the conditioning agent is supplied from a common source and, therefore, there is a common point A in the piping upstream of the branching point 58 between branches 26 and 30 whereat the total flow of sulfur trioxide gas is at a pressure $P_A$. The process gas supplied through the branches 26 and 30 ultimately discharges through the manifolds 20 and 22 and the probes 24 into the flue gas ducts 32 and 34 in regions B and C, where the ducts are at corresponding pressures $P_B$ and $P_C$. Thus, there is a resistance to flow that can be defined by the pressure drop from the common point A to the injection points B and C (e.g., $(P_A-P_B)$ and $(P_A-P_C)$.

In the absence of any modulating influence (e.g., modulating valves 54 and 56), the flow of gas in each branch will equilibrate in proportion to the pressure drop through each flow path. For example, in typical flue gas applications, the ducts are generally under negative pressure, for example about −10 to about −25 inches of water (−2.5 kPa to about −6.2 kPa). When the pressure in the ducts is equal ($P_B=P_A$), then the flow will split to establish a resistance thorough each branch that is substantially equal. If the two branches are designed to he identical (e.g., piping, manifold geometry, etc.) then each branch will receive an equal flow of sulfur trioxide-containing gas.

When there are differences in pressure or design, however, then there will be a differences in flow. For example, if the ducts are at equal pressure but one branch has twice as many probes as the other, then the branch with more probes must receive twice as much gas flow to balance the resistance. Flow elements such as flow elements/transmitters 48 and 50 together with a controller such as flow controller 52 and modulating valves 54 and 56 can be used to change the resistance to flow and pressure drop in branches 26 and 30, however, such equipment comes in direct contact with hot sulfur trioxide gas, and is very susceptible to corrosion and malfunction.

Example 2

Figure 2:
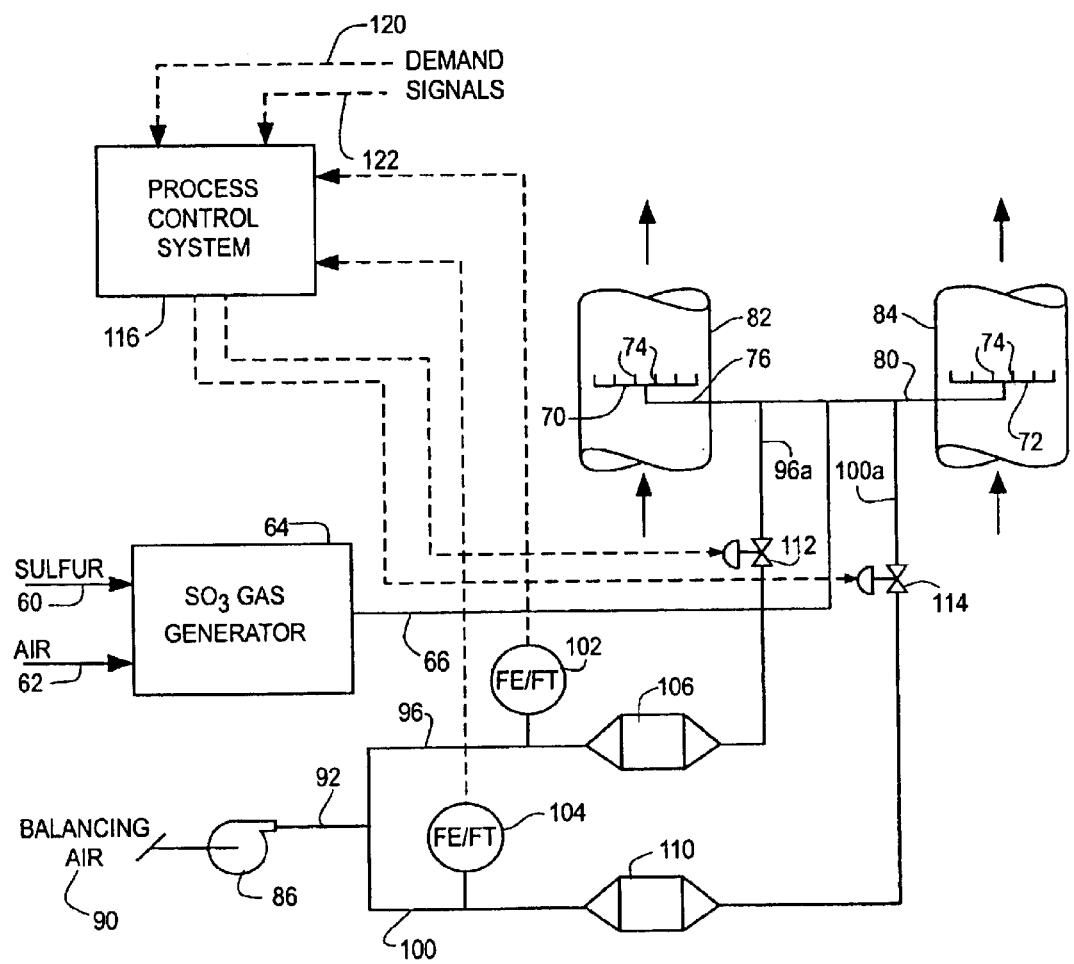
FIG. 2 shows an embodiment of apparatus for injecting streams of sulfur trioxide in air from a common source into two flue gas ducts.

FIG. 2 illustrates a process and apparatus wherein respective sources of sulfur 60 and air 62 are fed to a sulfur trioxide gas generator 64 to generate a single stream of sulfur trioxide gas in air (conditioning gas) 66. The stream 66 is piped to injection manifolds 70 and 72 and probes 74 via two branches 76 and 80, respectively, of the stream 66 The injection manifolds 70 and 72 are disposed within flue gas ducts 82 and 84, respectively.

An auxiliary fan 86 is provided to feed a source of balancing air 90 in line 92 split into balancing air branches 96 and 100. Branches 96 and 100 have associated flow sensors/transmitters 102 and 104, heaters 106 and 110, and modulating valves (balancing air flow controllers) 112 and 114 for injection into conditioning gas branches 76 and 80, respectively. Optionally, the balancing air 90 can be provided by a blower or fan that is shared with the sulfur trioxide generator 14. A process control system 116 (e.g., a programmable logic controller) receives flow signals of the conditioning agent flow or a signal from the sulfur trioxide gas generator to infer the conditioning agent flow, such as the sulfur flow, receives demand signals 120 and 122, which are related (e.g., directly or inversely proportional) to the amount of conditioning gas required in each flue gas duct 82 and 84, respectively, per unit of time, and receives balancing air flow signals from flow sensors 102 and 104. A demand signal can be any measurement that is related (e.g., directly or inversely proportional) to the sulfur trioxide requirement, including boiler load, fuel consumption, opacity of the flue gas stream, and effluent gas flow. The control system 116 communicates with and controls modulating valves 112 and 114.

The process control system 116 receives demand signals from each of the flue gas treatment systems (not shown), and determines the total amount of conditioning gas 66 required for both systems. The process control system 116 then responds by making appropriate adjustment (if any) to the total quantity of sulfur trioxide-in-air stream 66 produced via known methods. The process control system 116 also determines the amount of conditioning gas 66 required in each flue duct 82 and 84, and responds to affect the flow division of stream 66 between conduits 76 and 80. The flow division of stream 66 is affected by injecting additional balancing air 90 into the branch 76 or 80 requiring less conditioning gas in duct 82 or 84 to displace the conditioning gas 66 into the other branch 76 or 80 that requires more conditioning agent 66.

Preferably, sufficient balancing air flow is provided through pipes 96 and 100 to prevent backflow of conditioning gas and/or stagnation of conditioning gas in portions 96a and 100a of pipes 96 and 100 downstream of valves 112 and 114. Preventing backflow will protect balancing air equipment such as valves 112 and 114, heaters 106 and 110, flow elements 102 and 104, and pipes 96 and 100 themselves. In addition, in a case where balancing gas might need to be fed only to branch 80, thereby otherwise requiring the closure of valve 112 to eliminate flow of balancing gas to branch 76, such an operation would result in backflow of conditioning gas to in portion 96a of pipe 96 to the point of valve 112 and potential stagnation of the gas in such areas, leading to potential corrosion and fouling. Thus, in a preferred method of operation, a minimum amount of balancing air 90 flow in pipe 96 will be maintained, and an equal amount of flow can be added to pipe 100 to maintain the desired division of conditioning gas flow. The minimum amount needed to prevent backflow and/or stagnation will differ from application-to-application and be influenced by various factors including the pressure drop in the various pipes and the flow rates required. Determination of a minimum amount, however, is within the level of skill of an ordinary artisan, and can also be determined by a simple trial-and-error procedure.

Since the balancing gas 90 adds volume to the flow in the branch to which it is added, it participates in determining the resistance to flow experienced in that branch. Thus, for example, assuming that the branches 76 and 80 have identical design and geometry (e.g., length, cross-section; and number of probes 74), and each initially receives 100 cubic feet per minute (CFM) (2832 liters per minute (l/min)) of the total 200 CFM (5664 l/min) of conditioning gas 66, if an additional 100 CFM (2832 l/min) of hot air (balancing gas) is injected into one branch for a total flow of 300 CFM (8496 l/min), then 50 CFM (1416 l/min) of conditioning gas 66 will be displaced from that branch into the other. Thus, at equilibrium, each branch has 150 CFM (4248 l/min) of flow, or one-half the total, and the flow of conditioning agent has been adjusted, resulting in 50 CFM (1416 l/min) flow of conditioning agent in the branch receiving balancing gas and 150 CFM (4248 l/min) flow of conditioning agent in the branch not receiving balancing gas.

Thus, it is seen that by controlled injection of an appropriate amount of balancing gas, such as air in the example, it is possible to quantitatively control the amount of conditioning agent supplied from a common source to a plurality of locations without valves or flow sensors in the conditioning gas streams. The use of one or more modulating flow control devices can be relocated into a balancing gas stream, which provides potential advantages of being free from fouling and other sources of unreliability present in prior apparatus and methods. Sensitive flow control equipment such as flow sensors and control valves will thus be more reliable. In addition, the enablement of the use of a common conditioning agent source for a plurality of treatment locations affords financial benefits to the user, such as less equipment to purchase, maintain, operate, and house.

The addition of balancing gas has another process benefit in that the flow to each injector conduit is not reduced when the flow of conditioning agent is reduced. In the example, the flow of conditioning agent was reduced by 50% to the conduit receiving balancing gas. With the injection of heated balancing air, the temperature of the gas mixture is maintained above condensation temperature of the conditioning agent, which can substantially reduce or eliminate corrosion and plugging of the injectors and conduit.

The foregoing description is given for clearness of understanding only, and no unnecessary limitations should be understood therefrom, as modifications within the scope of the disclosure may be apparent to those having ordinary skill in the art.

What is claimed is:

1. A method for controlling the flow division of a gas stream, comprising the steps of:

dividing a process gas stream into process gas stream fractions; and injecting a balancing gas stream into a process gas stream fraction in an amount sufficient to displace a portion of gas flow from said process gas stream fraction into one or more remaining process gas stream fractions.

2. The method of claim 1, wherein said process gas comprises a corrosive gas.

3. The method of claim 1, wherein said process gas is substantially free of particulate matter.

4. The method of claim 1, wherein said balancing gas is substantially inert.

5. The method of claim 1, wherein said balancing gas is substantially free of particulate matter.

6. The method of claim 1, wherein said process gas comprises sulfur trioxide and said balancing gas comprises air.

7. The method of claim 6, further comprising the step of heating said balancing gas stream.

8. The method of claim 1, wherein said process gas comprises ammonia and said balancing gas comprises air.

9. The method of claim 1, wherein said step of dividing said process gas stream into process gas stream fractions is performed with apparatus comprising an inlet conduit for receiving said process gas stream in fluid communication with outlet conduits.

10. The method of claim 9, wherein said step of injecting a balancing gas stream into a process gas stream fraction is performed with apparatus comprising a balancing gas feed conduit in fluid communication with an outlet conduit and a blower.

11. The method of claim 10, wherein said apparatus further comprises a balancing gas controller.

12. The method of claim 1, further comprising the step of dividing said balancing gas stream into balancing gas stream fractions and selectively injecting a balancing gas stream fraction into a process gas stream fraction in an amount sufficient to displace a portion of process gas flow from said process gas stream fraction into one or more remaining process gas stream fractions.

13. The method of claim 12, further comprising the step of maintaining sufficient balancing gas flow in said balancing gas stream fractions to prevent backflow and/or stagnation of said processing gas.

14. The method of claim 12, wherein said step of dividing said balancing gas stream into balancing gas stream fractions is performed with apparatus comprising a common balancing gas feed conduit in fluid communication with balancing gas stream fraction conduits.

15. The method of claim 14, wherein said step of selectively injecting a balancing gas stream fraction into a process gas stream fraction is performed with apparatus comprising a balancing gas stream fraction conduit in fluid communication with a blower and a valve.

16. The method of claim 15, wherein said apparatus further comprises a heater in thermal communication with said balancing gas stream fraction conduit and a flow sensor disposed upstream of said heater and said valve.

* * * * *